(12) United States Patent
Layfield

(10) Patent No.: US 6,251,454 B1
(45) Date of Patent: Jun. 26, 2001

(54) PREPARATION OF COATED CONFECTIONERY

(75) Inventor: Edward Layfield, Birmingham (GB)

(73) Assignee: Cadbury Schweppes PLC, London (GB)

( * ) Notice: Subject to any disclaimer, the term of this patent is extended or adjusted under 35 U.S.C. 154(b) by 0 days.

(21) Appl. No.: 09/380,255

(22) PCT Filed: Feb. 27, 1998

(86) PCT No.: PCT/GB98/00627

§ 371 Date: Oct. 27, 1999

§ 102(e) Date: Oct. 27, 1999

(87) PCT Pub. No.: WO98/38871

PCT Pub. Date: Sep. 11, 1998

(30) Foreign Application Priority Data

Mar. 5, 1997 (GB) .................................................... 9704563

(51) Int. Cl.[7] ...................................................... A23G 3/00
(52) U.S. Cl. ........................... 426/302; 426/93; 426/306; 426/307; 425/101; 425/237
(58) Field of Search ............... 426/93, 285, 289, 426/293, 297, 302, 306, 307, 308, 309, 453, 512; 425/99, 100, 101, 237

(56) References Cited

U.S. PATENT DOCUMENTS

| 2,497,212 | * | 2/1950 | Donofrio | 425/237 X |
| 2,705,462 | * | 4/1955 | Reinhard | 425/237 |
| 4,120,627 | | 10/1978 | Abe | 425/92 |
| 5,078,204 | | 1/1992 | Loffredo et al. | 165/89 |
| 5,558,894 | * | 9/1996 | Henson et al. | 425/237 X |
| 5,902,621 | * | 5/1999 | Beckett et al. | 426/512 X |
| 5,993,874 | * | 11/1999 | Takashima et al. | 426/302 |

FOREIGN PATENT DOCUMENTS

| 119705 | 5/1927 | (DE) . |
| 1 223 677 | 8/1966 | (DE) . |
| 641682 | 8/1950 | (DK) . |
| 0 197 222 | 11/1985 | (EP) . |
| 002064651 | 3/1977 | (JP) . |
| 95/24131 | 9/1995 | (WO) . |

* cited by examiner

Primary Examiner—Milton Cano
(74) Attorney, Agent, or Firm—Wells, St. John, Roberts, Gregory & Matkin, P.S.

(57) ABSTRACT

Coated confectionery is formed by introducing pieces of a first confectionery material into recesses in one of a pair of cooled rollers. These are carried around by contra-rotation of the rollers to a nip where chocolate or the like is introduced into the nip to coat the pieces so as to produce the coated confectionery.

11 Claims, 1 Drawing Sheet

PREPARATION OF COATED CONFECTIONERY

Figure 1:
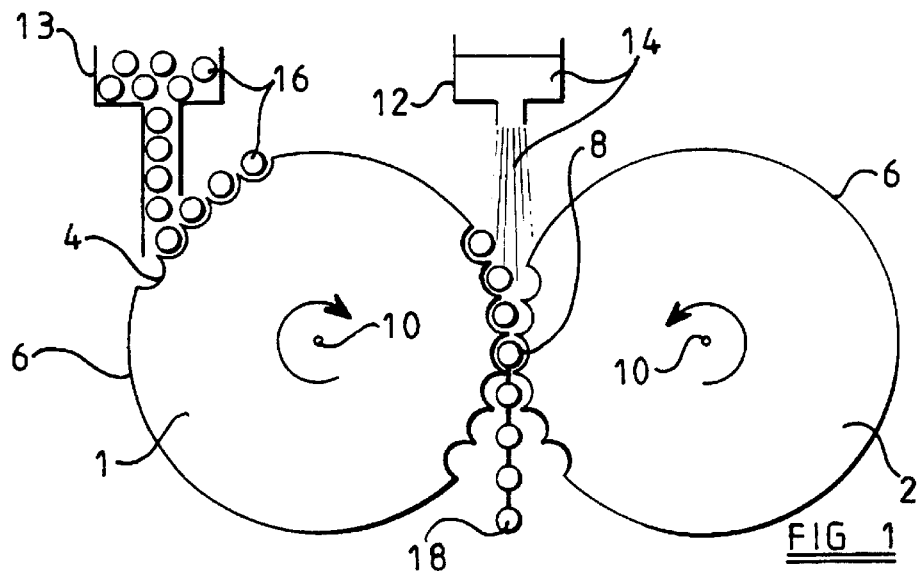

This application is a 371 of PCT/GB98/00627 filed Feb. 27, 1998.

The present invention relates to a process for the preparation of confectionery products, wherein at least one first confectionery component is at least partially coated by at least one second confectionery component.

It is well known to prepare chocolate-coated confectionery centres by such methods as enrobing (Chocolate, Cocoa and Confectionery: Science and Technology, B. W. Minifie; Churchill Press, 1970: pp129–136) or panning (ibid pp137–138). The former requires a great deal of skill to maintain uniform coating of chocolate on the centres, whilst the latter also requires skill and is, furthermore, a slow process which is only suitable for sufficiently robust centres. Particular problems arise with the panning of small, ie. under 8 mm, centres such as raisins and expanded cereal, which often results in much extended panning times, unevenly sized particles and the coated centres becoming stuck together.

It is also known to make use of a drop-roller system to make small, usually spherically shaped articles such as chocolate drops or boiled sweets (ibid p118). However, it is impracticable in a conventional drop-roller system to use soft confectionery components such as base-creme, fudge, noisette, fondant creme, turkish delight or soft caramel.

It is an object of this invention to provide an efficient and versatile coating process suitable for a wide range of confectionery centres and coating materials.

According to the present invention, there is provided a process for the preparation of confectionery products, comprising the steps of a) supplying at least one first confectionery component and at least one second confectionery component to a nip defined by the juxtaposition of a pair of forming elements, at least one of said pair of forming elements having a multiplicity of recesses in one surface; and b) passing said confectionery components through said nip by motion of said forming elements so as to form the products to the required shape by means of the recesses and to cause said first confectionery component to be at least partially coated by said second confectionery component.

Preferably, each of said pair of forming elements has a multiplicity of recessses in a surface thereof, and the forming elements are arranged so that respective recesses in the two forming elements lie opposite one another in the nip defined between the forming elements.

Preferably step (b) is effected by downward motion of said forming elements.

The process may in addition comprise the step of providing an additional coating layer. This is advantageous if there is only partial coating of said first confectionery component and provides a smoother surface, and in any case may be used to increase the size of the confectionery product. Preferably, said additional coating layer is provided by a panning procedure, which may be of short duration.

In a first embodiment, in step (a) above, said at least one first confectionery component is supplied directly to the nip, whereas said at least one second confectionery component is supplied indirectly to the nip by supplying it to the recesses of at least one of said forming elements and moving the thus supplied recesses to the nip. Thus, it is to be understood that the same or different second confectionery components may be supplied independently to the recesses of each forming element.

In a second embodiment, in step (a) above, said at least one first confectionery component is supplied indirectly to said nip by supplying it to the recesses of at least one of said forming elements and moving the thus supplied recesses to the nip, whereas said at least one second confectionery component may be supplied either directly to the nip or indirectly as in the first embodiment. Thus it is to be understood that the same or different first confectionery components and/or the same or different second confectionery components may be supplied independently to the recesses of each forming element.

Preferably the recesses are supplied with said at least one second confectionery component before being supplied with said at least one first confectionery component. Most advantageously, said at least one second confectionery component is supplied so that it completely covers the surfaces of the recesses.

Preferably, the process makes use of forming elements which are cooled to below ambient temperature, more preferably, −10° C. to −20° C., most preferably about −18° C.

Preferably, the process is effected using a nip defined by a spacing between the forming elements which is 1 to 3 mm, more preferably about 2 mm.

Preferably, the recesses in the surface of one of said forming elements are aligned with respective recesses in the surface of the other forming element at the nip. The recesses may be hemispherical or elongate. Preferably, the elongations extend transversely to the direction of motion of the forming elements.

Because of the spacing between the forming elements, the products are generally obtained interconnected by a web of said second confectionery component, which may be removed subsequently, if required, by for example tumbling in a drum which is perforated so that only the resultant web pieces pass through.

Preferably, the process uses cylindrical rollers as the forming elements, so that step (b) is effected by contra-rotation of said cylindrical rollers about their respective longitudinal axes. Preferably, said longitudinal axes lie in a substantially horizontal plane.

In the process described, said second confectionery component may be any solidifiable liquid confectionery component suitable for coating e.g. chocolate, a chocolate-flavoured confection, another fat-based confection, or a sugar syrup which may be supplied in step (a) by for example deposition or spraying. Preferably, the process uses chocolate in any of its forms (eg. plain, milk, white) as the second confectionery component. Such a solidifiable liquid confectionery component will at least partially solidify on contact with said cooled forming elements.

The process may use any suitable first confectionery component(s), such as nuts, cherries, raisins and ginger. Surprisingly, such a process is also suitable even for brittle components such as malted milk balls and expanded cereals.

The process as described in the first embodiment is particularly suitable for soft or sticky first confectionery components, such as noisette, base-creme fudge, soft caramel, fondant creme, nougat and turkish delight. Said soft or sticky first confectionery component may be supplied to the nip in discrete pieces or as a continuous sheet.

Figure 2:
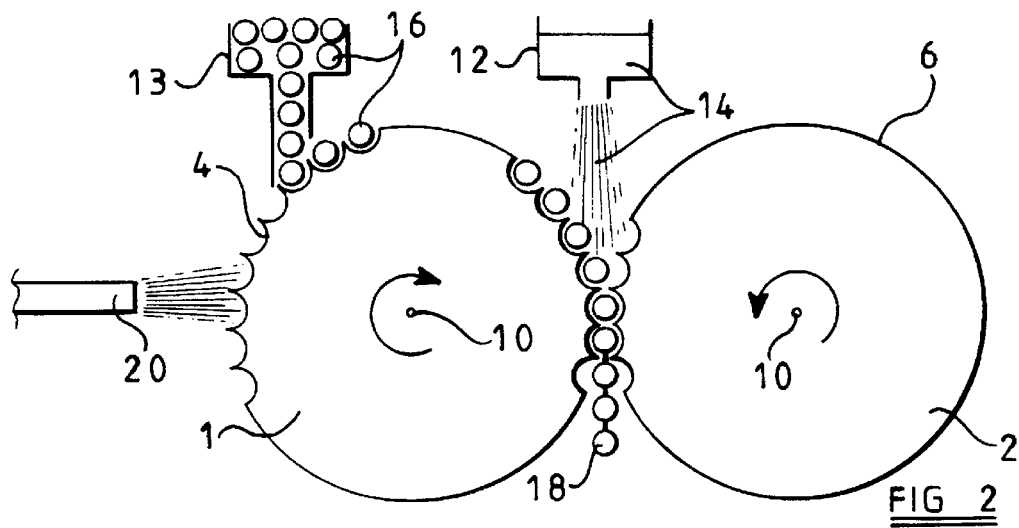
Figure 3:
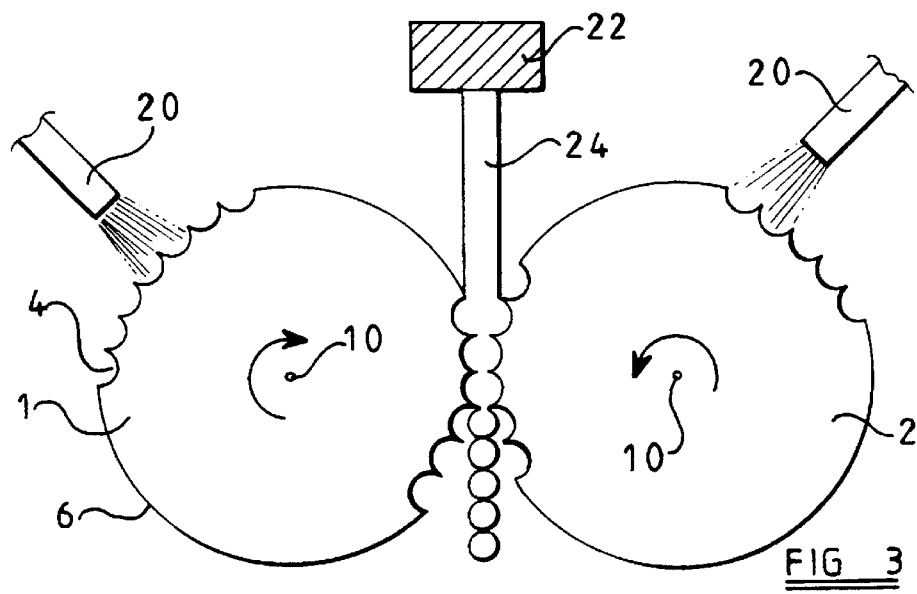

Embodiments of the present invention will now be described by way of example, with reference to the accompanying drawings, wherein FIGS. 1 to 3 show different configurations of apparatus suitable for dispensing confectionery components and forming them according to the process of the invention.

Referring now to FIG. 1, a first cylindrical roller 1 and a second cylindrical roller 2, each having a multiplicity of hemispherical recesses 4 over their entire (not shown) peripheral surfaces 6 are spaced so as to define a nip 8. The rollers 1 and 2 have mutually parallel longitudinal axes 10 lying in a horizontal plane. A motor (not shown) drives both rollers 1 and 2. A hopper 12, for dispensing chocolate 14 or other suitable solidifiable liquid component, is provided vertically above the nip 8, and a second hopper 13 for gravity feeding a controlled quantity of expanded cereal pieces 16 or other suitable confectionery pieces, is provided at the 11 o'clock position (as viewed in FIG. 1) of the first roller 1. The hopper has a lower outlet which is spaced from the peripheral surface 6 of the roller 1 by a distance which is slightly larger than the diameter of the confectionery pieces. Thus, the outlet of the hopper 6 together with the underlying moving recesses 4 define a gravity feed mechanism which enables each confectionery piece to be supplied on demand into a respective recess 4.

In use, the rollers are cooled and contra-rotated in the directions shown. Chocolate 14 is supplied from the hopper 12 to the nip 8 and expanded cereal pieces 16 are gravity fed from the hopper 13 on demand into recesses 4 in the first roller 1. The cereal pieces 16 thus located in the recesses of the first roller 1 are transported therein to the nip 8, where they are partially coated by the now solidifying chocolate. At the nip 8 the partially coated pieces are formed by the recesses 4 into spherical pips 18, which after passing through the nip 8, are interconnected by a thin web of chocolate.

In FIG. 2, the apparatus as described above is used, with the addition of a spraying device 20, located at the 9 o'clock position (as viewed in FIG. 1) of the first roller 1. The process is as described above with reference to FIG. 1, except that the cereal 16 is not released until the spraying device 20 has supplied a layer of chocolate to the recesses 4 of the first roller 1. In this way the spherical pips 18 obtained after passing through the nip 8 are completely coated with chocolate.

In FIG. 3, the rollers 1 and 2 as described above are used, in conjunction with a pair of spraying devices 20 which are located at the 10 o'clock position of the first roller 1 and the 2 o'clock position of the second roller 2. An extruder 22 capable of supplying a continuous sheet 24 of soft caramel is located vertically above the nip 8. In use, the caramel sheet 24 is supplied to the nip 8, and chocolate is supplied to the rollers 1 and 2 by the two spraying devices 20. The recesses 4 are coated with the chocolate before the caramel is fed to the nip 8 so as to prevent sticking of the caramel to the rollers 1 and 2. The caramel emerges from the nip 8 completely coated by chocolate in the form of spherical pips 18 interconnected by a fine web.

The invention is further described below in the following Examples. In all the Examples, a pair of Microwaerk drop rollers of diameter 320 mm and length 400 mm, having hemispherical recesses of 15 mm diameter therein and a 2 mm wide nip was used. The rotation speed was 0.3 rpm and the temperature of the rollers was −18° C.

EXAMPLE 1

The apparatus diagrammatically illustrated in FIG. 1 was used. Hopper 13 covering the full length of the rollers 1 and 2 was fitted 1 mm above the first roller 1 at the 11 o'clock position. The hopper 13 was kept topped up with 8 mm expanded cereal pieces so that such pieces were gravity fed on demand. At the same time, untempered milk chocolate at 40° C. was fed directly into the nip 8 of the rollers 1 and 2 from the hopper 12. Spherical shaped pips of chocolate-coated cereal, with cereal partially exposed on one face, emerged in a continuous web of chocolate. The web was removed by tumbling in a perforated drum and the resultant discrete pips were panned with the minimum amount of milk chocolate necessary to cover the exposed cereal.

EXAMPLE 2

This was performed as in Example 1, except that 6 mm cereal pieces were used instead of 8 mm cereal pieces. The finished pips contained 2 or 3 pieces of cereal.

EXAMPLE 3

This was performed as in Example 1, except that tempered milk chocolate at 28° C. was used instead of untempered milk chocolate at 40° C.

EXAMPLE 4

The apparatus diagrammatically illustrated in FIG. 2 was used. The spraying device 20 was a Graco airless pump and spraygun. The throughput of the chocolate was maintained so as to coat the recesses in the first roller 1 with a 0.5 to 1 mm film of chocolate. Once coating of the recesses of the first roller 1 had taken place, cereal pieces and additional chocolate were supplied as described in Example 1. The cereal in the resulting pips was totally enclosed in chocolate.

EXAMPLE 5

The apparatus diagrammatically illustrated in FIG. 3 was used. At the 10 o'clock position of the first roller 1 and the 2 o'clock position of the second roller 2, untempered milk chocolate at 40° C. was sprayed using a Graco airless pump and sprayguns to give 0.5 to 1 mm thick chocolate coatings to the recesses 4 in both rollers. Turkish delight was then fed directly to the nip 8 as a continuous sheet. Chocolate-covered turkish delight emerged as evenly shaped spherical pips interconnected by a web.

What is claimed is:

1. A process for the preparation of confectionery products, comprising the steps of:
   a) supplying at least one first confectionery component and at least one second, solidifiable liquid confectionery component to a nip defined by the juxtaposition of a pair of forming elements, at least one of said pair of forming elements having a multiplicity of recesses in one surface; and
   b) passing said confectionery components through said nip by motion of said forming elements so as to form the products to the required shape by means of the recesses and to cause said first confectionery component to be fully coated by said second confectionary component; and
   (c) causing said second confectionery component to solidify.

2. A process as claimed in claim 1, wherein each of said of pair forming elements has a multiplicity of recesses in a surface thereof, and the forming elements are arranged so that respective recesses in the two forming elements lie opposite one another in the nip defined between the forming elements.

3. A process as claimed in claim 1, wherein step (b) is effected by downward motion of said forming elements.

4. A process as claimed in claim 1, further including the step of:
   c) providing an additional coating layer over said second confectionery component.

5. A process as claimed in claim 1, wherein step (a) is effected by supplying said at least one first confectionery component directly to the nip, and supplying said at least one second confectionery component indirectly to the nip by supplying it to the recesses of at least one of said forming elements and moving the thus supplied recesses to the nip.

6. A process as claimed in claim 1, wherein step (a) is effected by supplying said at least one first confectionery component indirectly to said nip by supplying it to the recesses of at least one of said forming elements and moving the thus supplied recesses to the nip, and supplying said at least one second confectionery component directly to the nip and/or indirectly to the nip by supplying it to the recesses of at least one of said forming elements and moving the thus supplied recesses to the nip.

7. A process as claimed in claim 1, wherein the recesses are supplied with said at least one second confectionery component before being supplied with said at least one first confectionery component.

8. A process as claimed in claim 7, wherein said at least one second confectionery component is supplied so that it completely covers the surfaces of the recesses.

9. A process as claimed in claim 1, wherein the forming elements are cooled to −10° C. to −20° C.

10. A process as claimed in claim 1, wherein the nip is defined by a spacing between the forming elements which is 1 to 3 mm.

11. A process as claimed in claim 1, wherein said at least one second, solidifiable liquid confectionery component is a fat-based confectionery component, and wherein step (c) is effected by cooling the forming elements to below the solidification temperature of said second confectionery component whereby to solidify the second confectionery component by contact with the forming elements in step (b).

* * * * *